(12) United States Patent
Maruyama et al.

(10) Patent No.: US 8,189,098 B2
(45) Date of Patent: May 29, 2012

(54) DIGITAL CAMERA HAVING DOUBLE HOUSING CONSTRUCTION FOR HEAT DISSIPATION, HIGH RIGIDITY, AND REDUCED TACTILE TEMPERATURE

(75) Inventors: Tetsuhiro Maruyama, Kokubunji (JP); Akira Suzuki, Fuchu (JP); Kenji Fukasawa, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 409 days.

(21) Appl. No.: 12/405,473

(22) Filed: Mar. 17, 2009

(65) Prior Publication Data

US 2009/0237537 A1     Sep. 24, 2009

(30) Foreign Application Priority Data

Mar. 19, 2008 (JP) ................................. 2008-072219

(51) Int. Cl.
  *H04N 5/225* (2006.01)
(52) U.S. Cl. ......... 348/374; 348/373; 348/375; 348/376
(58) Field of Classification Search ........... 348/373–376
  See application file for complete search history.

(56) References Cited

U.S. PATENT DOCUMENTS

| 2006/0055820 | A1* | 3/2006 | Lyon et al. | ........ 348/373 |
| 2006/0146176 | A1* | 7/2006 | Kato et al. | ........ 348/360 |
| 2008/0089678 | A1* | 4/2008 | Suzuki | ........ 396/439 |
| 2008/0156509 | A1 | 7/2008 | Ikeo | |

FOREIGN PATENT DOCUMENTS

| JP | 05-226853 A | 9/1993 |
| JP | 8-022069 A | 1/1996 |
| JP | 2000-032307 A | 1/2000 |
| JP | 2004-104632 A | 4/2004 |
| JP | 2006-91399 A | 4/2006 |
| JP | 2006-253196 A | 9/2006 |
| JP | 2008-164799 A | 7/2008 |

OTHER PUBLICATIONS

Japanese Office Action dated Dec. 10, 2009 and English translation thereof issued in counterpart Japanese Application No. 2008-072219.
Chinese Office Action dated May 12, 2010 and English translation thereof in counterpart Chinese Application No. 2009-10127641.2.
Japanese Office Action dated Mar. 25, 2010 and English translation thereof in counterpart Japanese Application No. 2008-072219.
Japanese Office Action dated Jul. 1, 2010 and English translation thereof, issued in counterpart Japanese Application No. 2008-072219.

* cited by examiner

*Primary Examiner* — Lin Ye
*Assistant Examiner* — Chia-Wei A Chen
(74) *Attorney, Agent, or Firm* — Holtz, Holtz, Goodman & Chick, PC

(57) ABSTRACT

In order to provide a digital camera which includes a heat dissipating device which can cool sufficiently a solid state image pick-up device and integrated circuits, which has a high rigidity and which affects little the design of the digital camera, there is provided a digital camera comprising a lens unit 15, a solid state image pick-up device 31 and integrated circuits 41, wherein a camera housing is made to have a double housing construction by an outer housing 11 which is formed of a member having a low thermal conductivity and an inner housing 61 which is formed of a member having a high rigidity and a high thermal conductivity, wherein a heat dissipating space is defined between the outer housing 11 and the inner housing 61, the integrated circuits 41 configuring a heat source and the inner housing 61 are connected together by a member having a high thermal conductivity, and wherein the inner housing 61 is made up of a main body side housing which is situated in the vicinity of the solid state image pick-up device 31 and the integrated circuits 41 and a lens side housing 62 which covers a circumferential edge of the lens unit 15, whereby heat is dissipated from the whole surfaces of the main body side housing and the lens side housing.

4 Claims, 9 Drawing Sheets

DIGITAL CAMERA HAVING DOUBLE HOUSING CONSTRUCTION FOR HEAT DISSIPATION, HIGH RIGIDITY, AND REDUCED TACTILE TEMPERATURE

CROSS-REFERENCE TO RELATED APPLICATIONS

This application is based upon and claims the benefit of priority under 35 USC 119 of Japanese Patent Application No. 2008-072219 filed on Mar. 19, 2008, the entire disclosure of which, including the description, claims, drawings and abstract, is incorporated herein by reference in its entirety.

BACKGROUND OF THE INVENTION

1. Field of the Invention

The present invention relates to a digital camera.

2. Description of the Related Art

There are digital cameras as devices for outputting image data for still pictures and moving pictures to a projector or a personal computer and recording such image data in a predetermined recording medium. These digital cameras are formed to include a lens unit having a fixed lens group and a movable lens group, a CCD (Charge-Coupled Device) or a CMOS (Complementary Metal-Oxide Semiconductor) as a solid state image pick-up device which is disposed in the vicinity of the lens unit, a liquid crystal display device and integrated circuits such as ASICs (Application Specific Integrated Circuits).

In these digital cameras, since, the solid state image pick-up device and the integrated circuits are heated to high temperatures, it is necessary to cool these components so that their temperatures are suppressed to their so-called operation ensuring temperatures or lower, and there have been made various proposals in relation to devices for cooling these solid state image pick-up device and the integrated circuits which are heated to higher temperatures.

For example, Japanese Unexamined Patent Publication No. 2006-91399 proposes a cooling method in which a vent hole is formed on a lens unit in a position lying in the vicinity of the camera housing, a heat conductive member (a heat pipe) is disposed on a back side of the solid state image pick-up device, and an end portion of the heat conductive member is extended to the vent hole on the lens unit, so that the solid state image pick-up device is cooled by cooling the heat conductive member.

In these days, digital cameras become smaller in size and thinner in thickness, and since various devices such as a solid state image pick-up device and an integrated circuit, various types of substrates, a battery and a liquid crystal display device are accommodated in a small and thin camera housing, there has been caused a problem that it is difficult to ensure a sufficient space for cooling the solid state image pick-up device and the integrated circuits.

In addition, although there has been adopted a method in which heat, of the solid state image pick-up device and the integrated circuits is released to a heat conductive member made of a metal material or the like, so that the solid state image pick-up device and the integrated circuits are cooled by cooling the metal material, since the digital camera is small and thin, there has been caused a problem that heat of the heat conductive member is conducted to the camera housing (an outer casing) and is then conducted to the hands of the photographer.

Then, there may be a case where the camera housing is formed of a material other than metals which has a low thermal conductivity. As this occurs, however, the rigidity of the camera is reduced, leading to a problem that the impact resistance is reduced.

SUMMARY OF THE INVENTION

The invention has been made in view of the problems inherent in the related art described above, and an object thereof is to provide a digital camera which includes a heat dissipating device which can cool sufficiently the solid state image pick-up device and the integrated circuits and which contributes to an increase in rigidity.

According to a preferred aspect of the invention, there is provided a digital camera comprising a lens unit, a solid state image pick-up device and an integrated circuit, wherein a camera housing is made into a double housing construction by an outer housing which is formed of a member having a low thermal conductivity and an inner housing which is formed of a member having a high rigidity and a high thermal conductivity and is made into a heat dissipating device, and wherein a heat dissipating space is defined between the outer housing and the inner housing.

In addition, in this digital camera, a component configuring a heat source in the camera housing and the inner housing are connected to each other by a member having a high thermal conductivity.

Further, the inner housing is formed of a main body side housing which is situated in the vicinity of the solid state image pick-up device and the integrated circuit and a lens side housing which covers a circumferential edge of the lens unit, and heat is dissipated from the whole surfaces of the body side housing and the lens side housing.

According to the aspect of the invention, the digital camera can be provided which includes the heat dissipating device which can cool the solid state image pick-up device and the integrated circuit so sufficiently that they are prevented from being heated to higher temperatures and which contributes to an increase in rigidity thereof.

BRIEF DESCRIPTION OF THE DRAWINGS

In addition.

Additionally.

DETAILED DESCRIPTION OF THE PREFERRED EMBODIMENT

Figure 1:
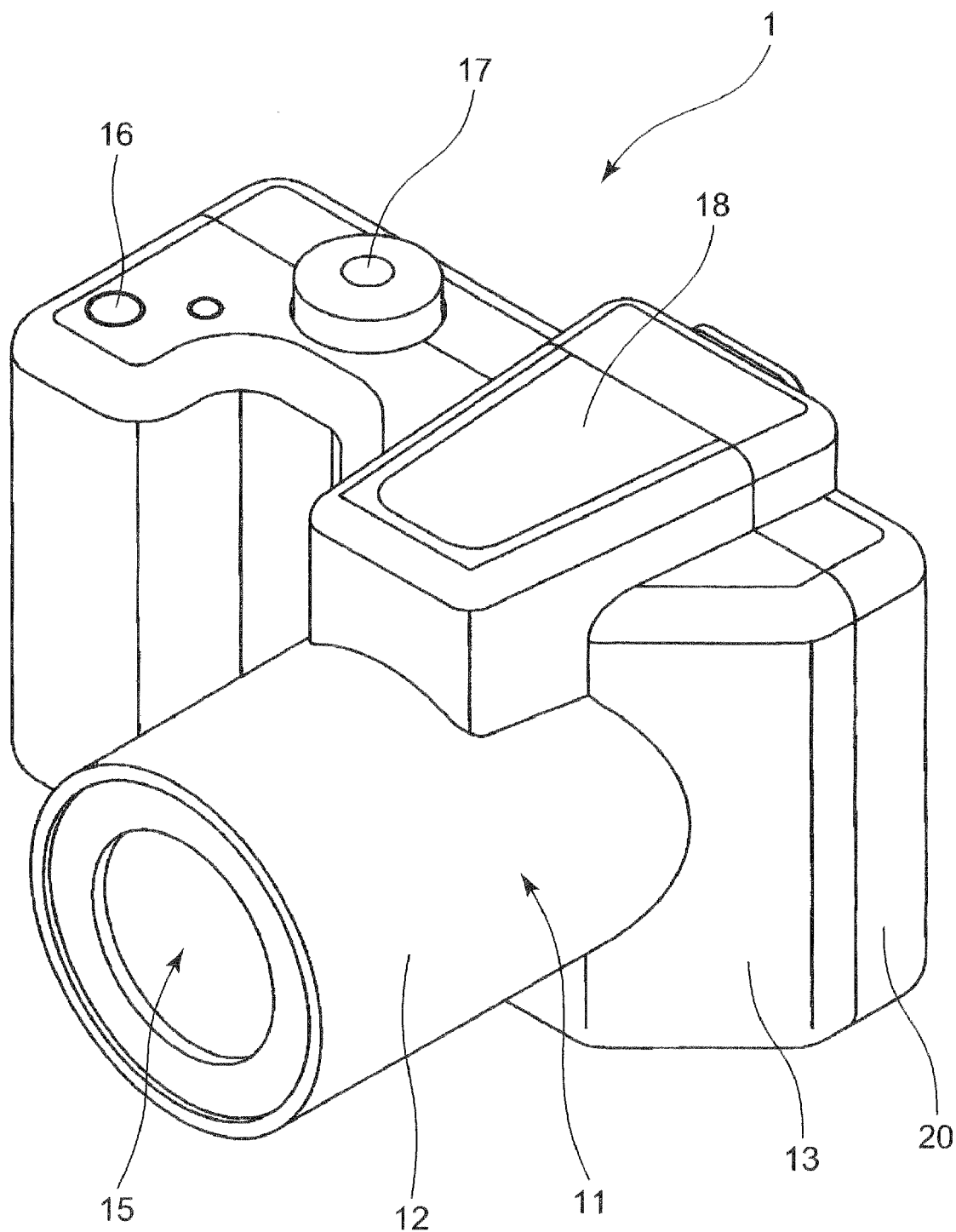
FIG. 1 is a front perspective view of a digital camera according to an embodiment of the invention.

A digital camera 1 in a best mode for carrying out the invention includes a lens unit 15, a solid state image pick-up device 31 and an integrated circuit 41. In addition, a camera housing is configured to have a double housing construction by an outer housing 11 which is formed of a member having a low thermal conductivity and an inner housing 61 which is formed of a member having a high rigidity and a high thermal conductivity and is made into a heat dissipating device and has a heat dissipating space defined between the outer housing 11 and the inner housing 61. In addition, the components configuring a heat source and the inner housing 61 are connected together by a member having a high thermal conductivity in an interior of the camera housing.

Further, the inner housing 61 includes a main body side housing 63 which is situated in the vicinity of the solid state image pick-up device 31 and the integrated circuit 41 and a lens side housing 62 which covers a circumferential edge of the lens unit 15, and heat is made to be dissipated from the whole surfaces of the main body side housing 63 and the lens side housing 62.

Hereinafter, an embodiment of the invention will be described based on the drawings. A digital camera 1 of the embodiment is a digital camera which includes a camera housing which is configured to have a double housing construction by an outer housing (an outer casing) 11 which is formed of a member having a low thermal conductivity (for example, a resin such as polycarbonate or the like) and an inner housing (frame) 61 which is formed of a member having a high rigidity and a high thermal conductivity (for example, a metal such as a magnesium alloy or the like) and is made into a heat dissipating device and which is adapted to sense or pick up still pictures and moving pictures.

Figure 2:
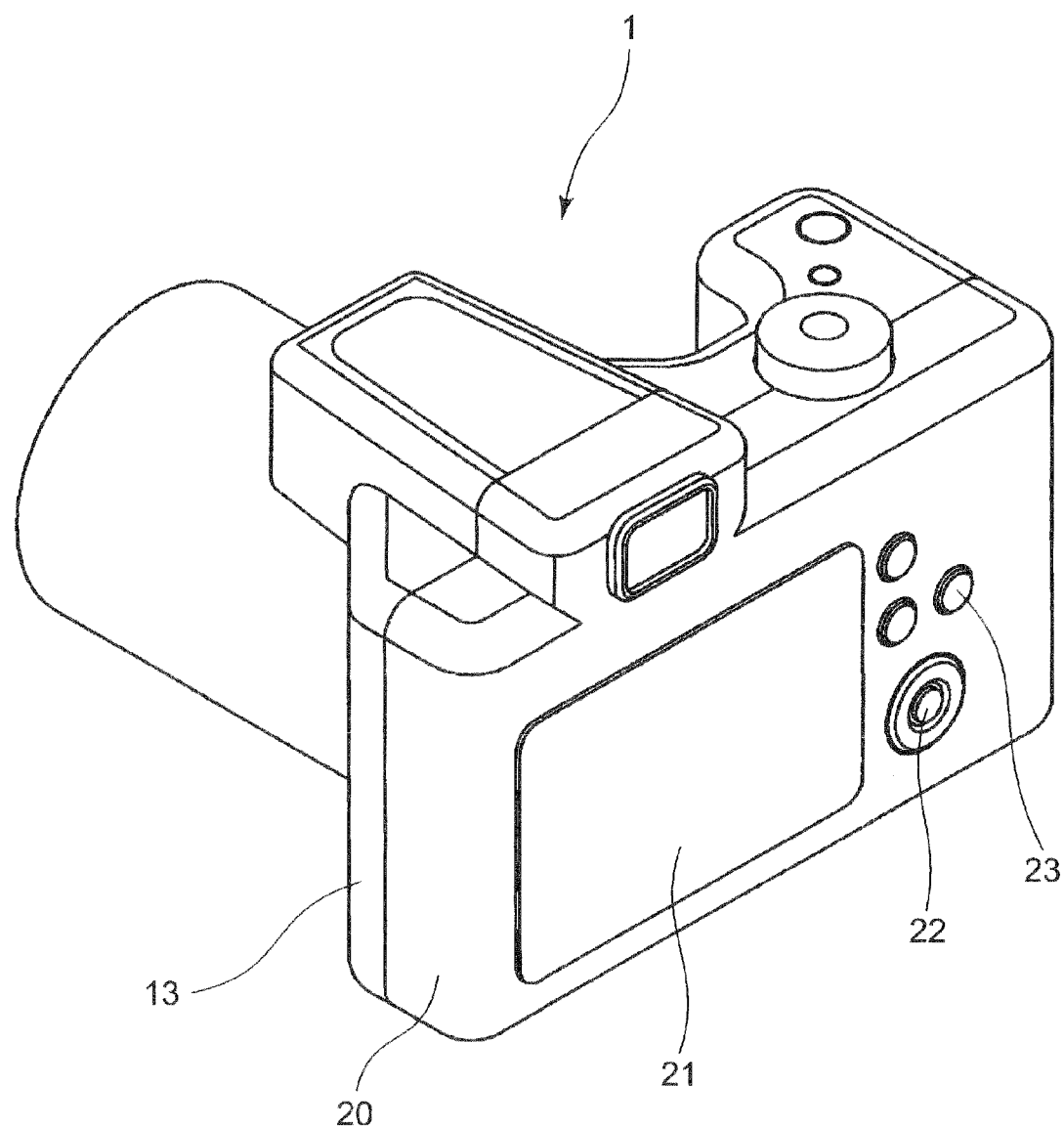
FIG. 2 is a back perspective view of the digital, camera according to the embodiment of the invention.

In addition, as is shown in FIG. 1, the outer housing 11 includes a front side projecting portion 12 which has the lens unit 15 in an interior thereof and which is formed so as to project in a front direction and a main body portion 13 which is situated at the rear of the front side projecting portion 12 to cover a camera main body, and a back side housing 20 which covers a back of the outer housing 11 is disposed on a back side of the outer housing 11. In addition, disposed on an upper side of the main body portion 13 of the outer housing 11 are a shutter button 16, an image pick-up mode switching control dial 17 and a flash 18. Further, as is shown in FIG. 2, disposed on the back side housing 20 are a display device 21, a direction key 22 and a menu choice button 23.

Figure 3:
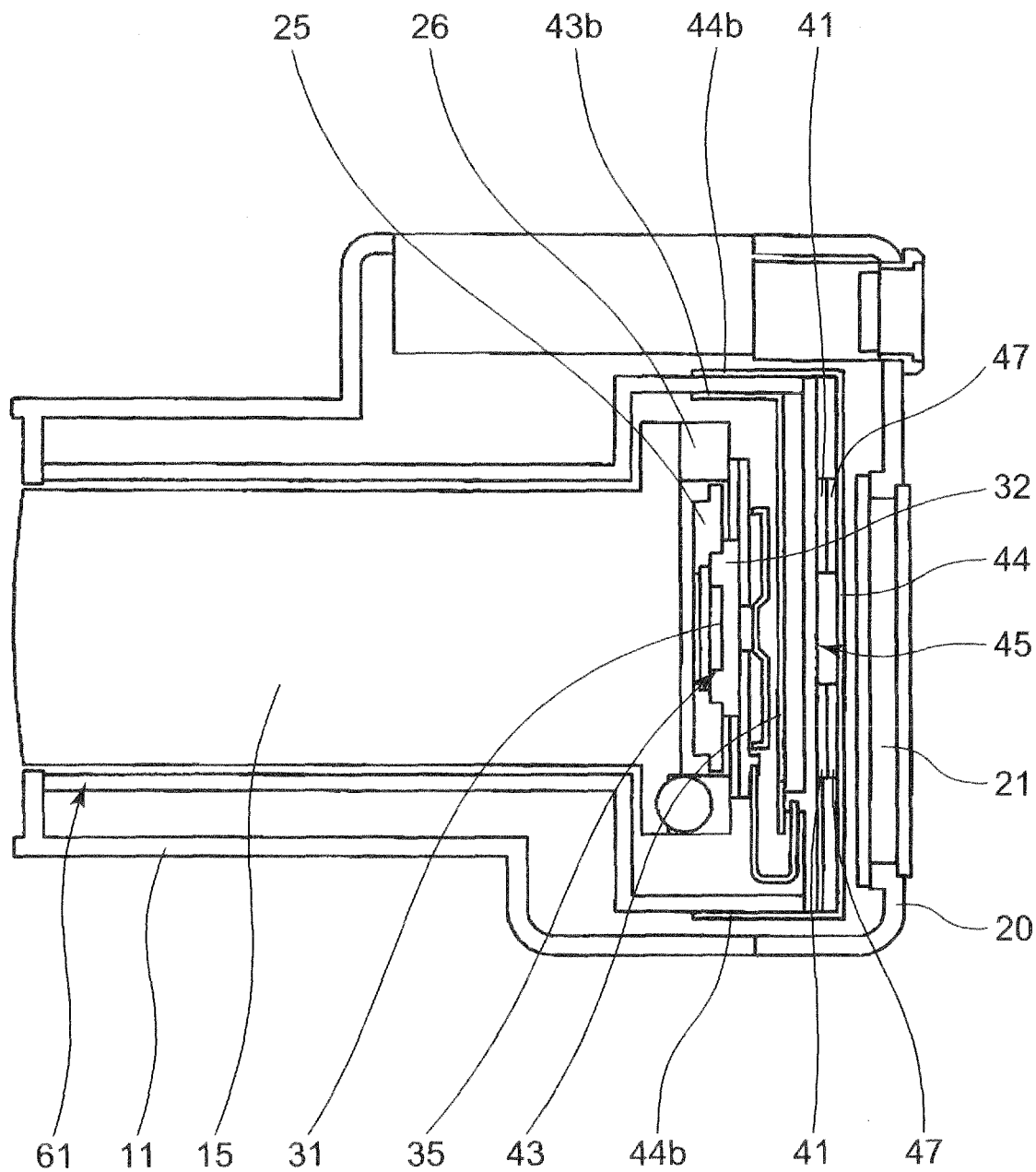
FIG. 3 is a sectional view of the digital camera according to the embodiment of the invention.
Figure 4:
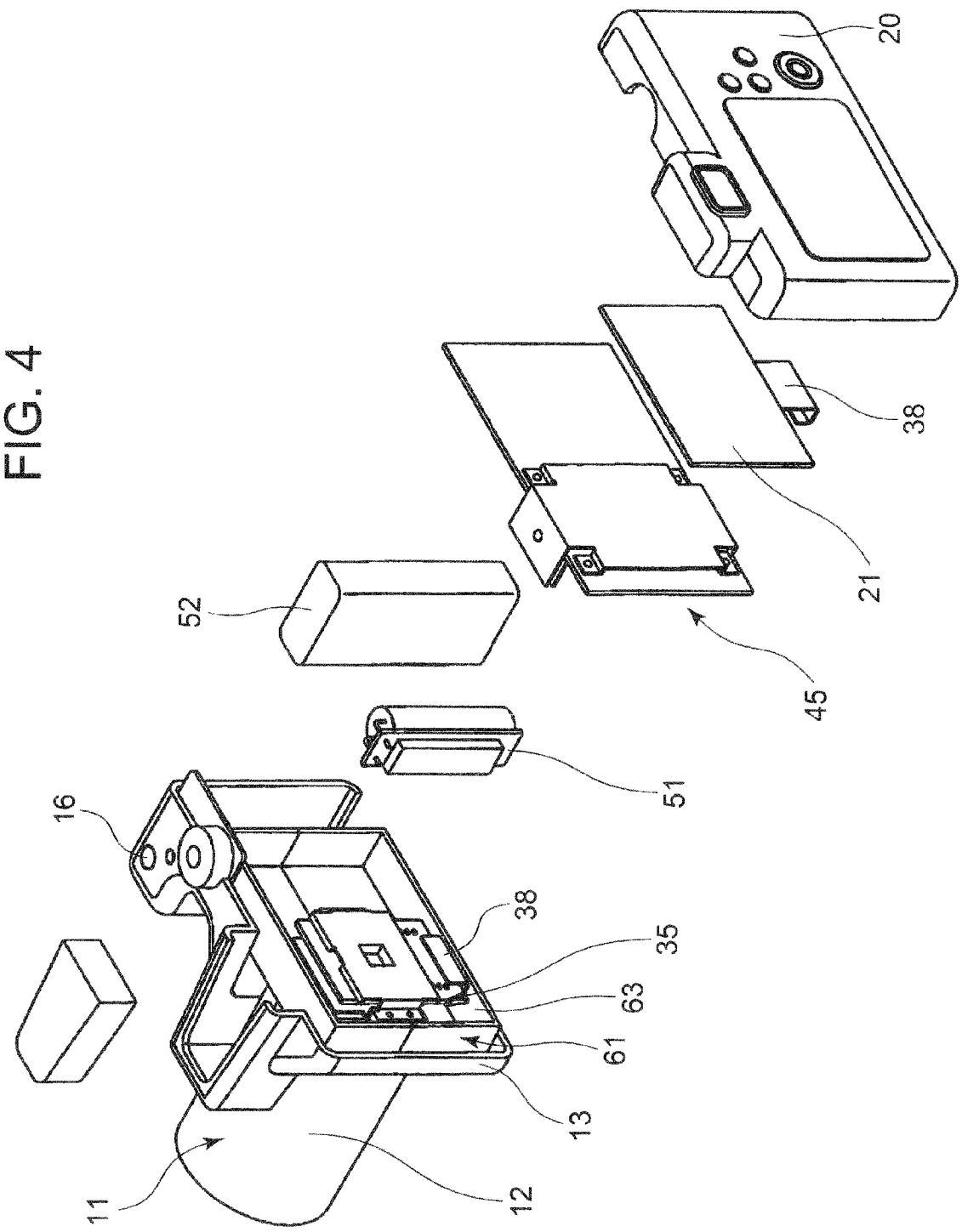
FIG. 4 is an exploded perspective view of the digital camera according to the embodiment of the invention.

In addition, the digital camera 1 includes in a interior thereof the inner housing 61 which has, as is shown in FIG. 3, the lens unit 15 including the movable lens group and the fixed lens group, a solid state image pick-up device block 35 which includes a CMOS (Complementary Metal-Oxide Semiconductor) functioning as the solid state image pick-up device 31 and which is disposed close to a back side of the lens unit 15, a movable unit 25 which causes the solid state image pick-up device 31 to operate to correct shaking, an integrated circuit block 45 which includes an ASIC (Application Specific Integrated Circuit) functioning as the integrated circuit 41 and the display device 21, as well as, as is shown in FIG. 4, a flash control circuit board 51 and a battery accommodation box 52 and holds these various types of devices with a certain space provided between the outer housing 11 and these devices.

Figure 5:
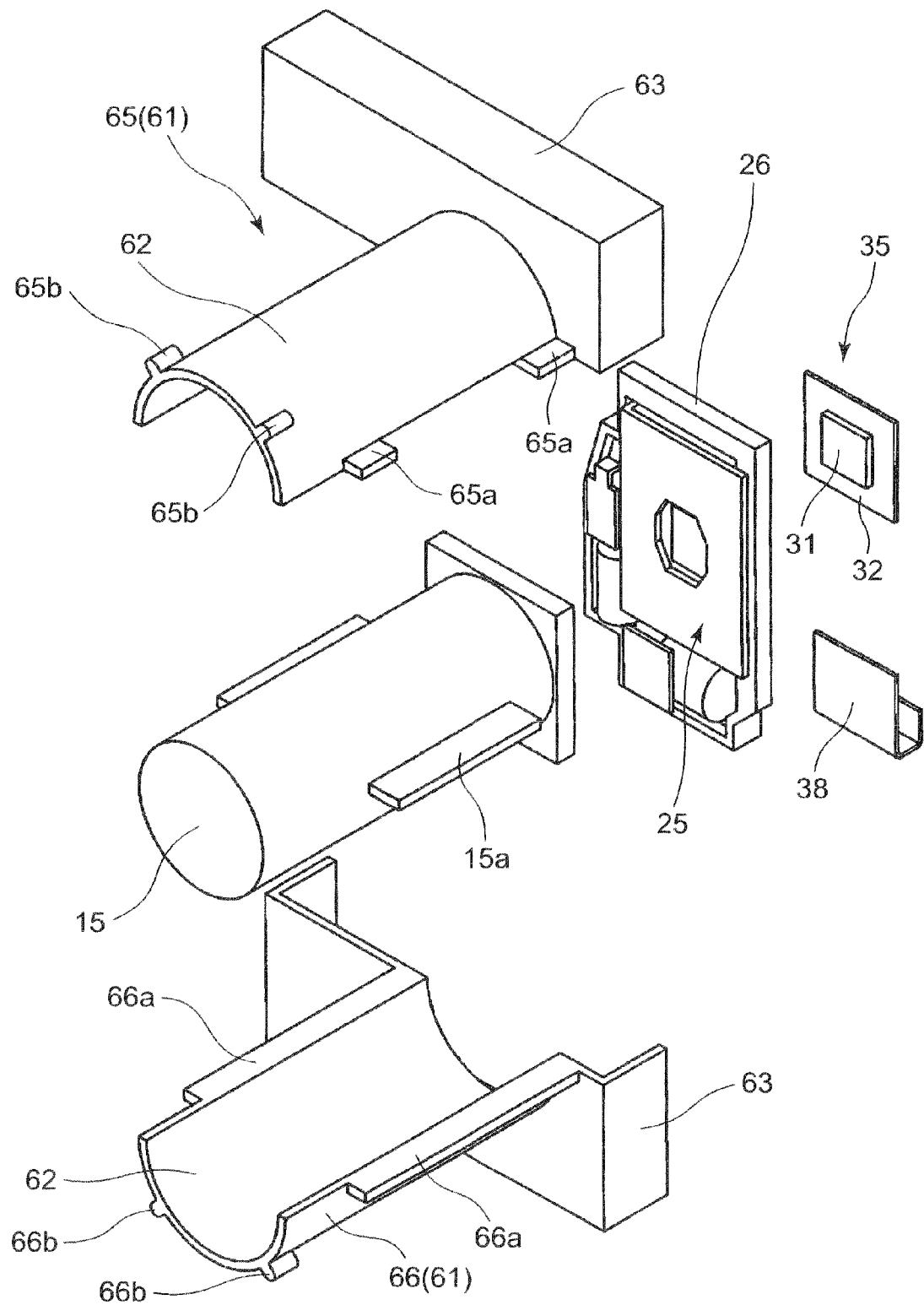
FIG. 5 is an exploded perspective view of an inner housing according to the embodiment of the invention.

Although not shown, the lens unit 15 includes the movable lens group and the fixed lens group and also includes a lens motor for operating the movable lens group and a circuit board for driving the lens motor, and zooming and focusing are made to be enabled by the movable lens group being operated by the lens motor. In addition, as is shown in FIG. 5, the lens unit 15 has a substantially cylindrical lens barrel which is formed from a resin such as polycarbonate and a square edge portion which is formed at a back side end portion of the lens barrel and includes fixing plates 15a which are formed in left and right-symmetrical positions on an outer circumferential edge of the lens barrel in such a manner as to project outwards and to which the inner housing 61 is to be fixed.

Figure 6:
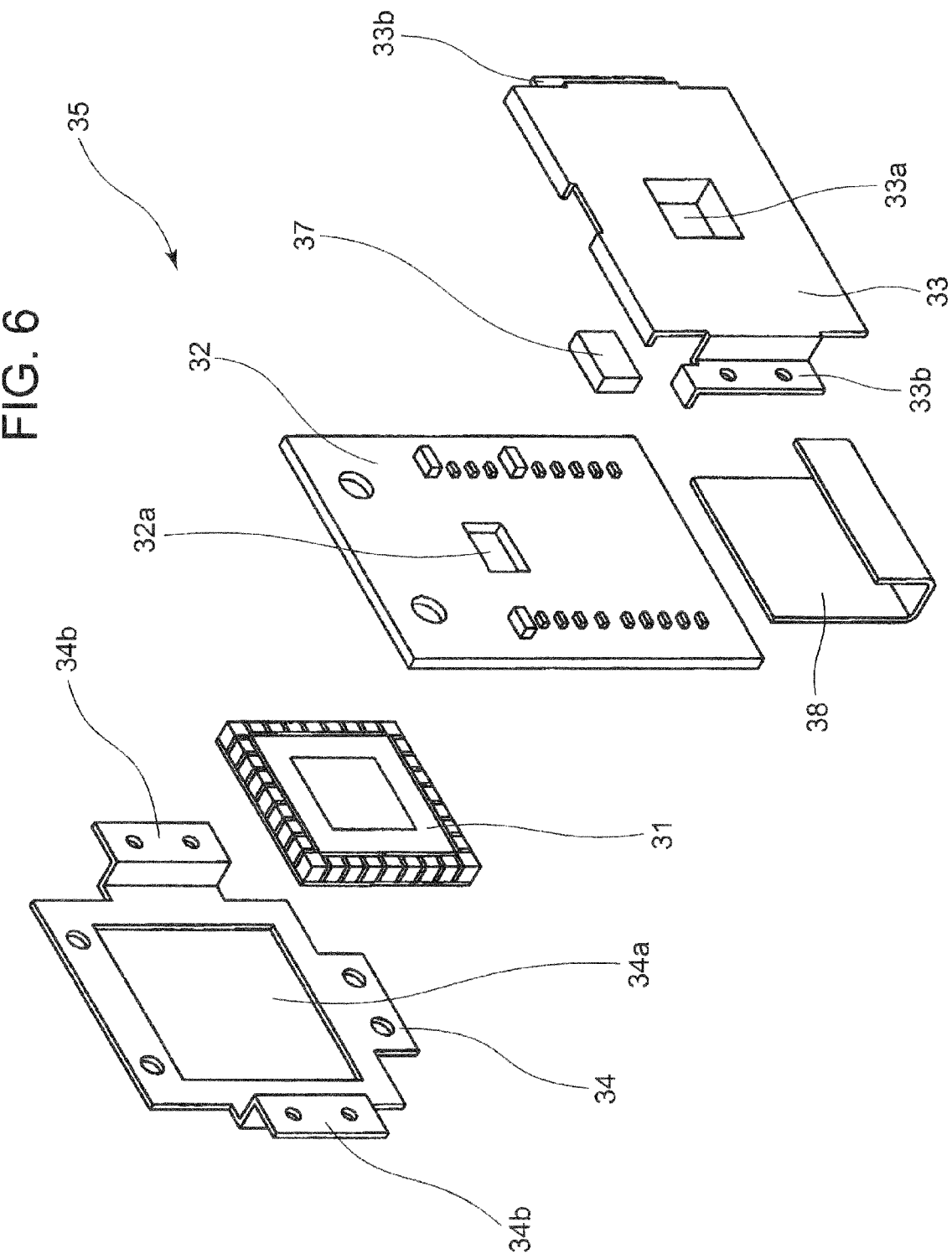
FIG. 6 is an exploded perspective view of a solid state image pick-up device block according to the embodiment of the invention.

Additionally, as is shown in FIG. 6, the solid state image pick-up device 31 made up of a CMOS and configuring a first heat source, a solid state image pick-up device fixing substrate 32 to which the solid state image pick-up device 31 is fixed, a solid state image pick-up device heat dissipating plate 33 which is connected to the solid state image pick-up device 31 via a heat conductive sheet 37 which is an insulation material, a connecting plate 34 which fix the solid state image pick-up device block 35 to the movable unit 25, and a flexible sheet 38 which electrically connects the solid state image pick-up device 31 with a main circuit board 42 of the integrated circuit block 45, which will be described later. In addition, the solid state image pick-up device block 35 is fixed to the movable unit 25 in a position lying in the vicinity of a back side end portion of the lens unit 15.

The solid state image pick-up device fixing substrate 32 is a rectangular plate, has an opening 32a in the vicinity of a center thereof where the heat conductive sheet 37 is positioned and is brazed to the connecting plate 34 in such a manner that the solid state image pick-up device 31 is fixed to a front side thereof.

In addition, the solid state image pick-up device heat dissipating plate 33 is made as a rectangular plate from a light and thin sheet of aluminum or the like, includes a projecting portion 33a which projects towards a front side in substantially a center thereof and also includes leg portions 33b which are formed on both lateral sides in such a manner as to project in the front direction. Additionally, this solid state image pick-up device heat dissipating plate 33 is fixed to the connecting plate 34, which will be described later, with machine screws with legs portions 34b of the connecting plate 34 made to confront the leg portions 33b of the solid state image pick-up device heat dissipating plate 33 in such a state that the projecting portion 33a is in contact with the heat conductive sheet 37 disposed in the opening 32a in the solid state image pick-up device fixing substrate 32, so as to dissipate heat transmitted thereto from the solid state image pick-up device 31 via the heat conductive sheet 37.

Further, the connecting plate 34 is a square plate, includes a square opening 34a through which the solid state image pick-up device 31 penetrates in substantially a center thereof and also includes the leg portions 34b which are formed on both lateral sides in such a manner as to project in a back direction. In addition, the connecting plate 34 is secured to the solid state image pick-up device fixing substrate 32 on a back thereof, while the connecting plate 34 is fixed to the movable unit 25 on a front thereof with machine screws. Thus, the connecting plate 34 causes the solid state image pick-up device block 35 to operate in such a manner as to match the movement of the movable unit 25.

The movable unit 25 is such as to cause the solid state image pick-up device 31 to operate to correct shaking when picking up an image. As is shown in FIGS. 3 and 5, the movable unit 25 is disposed close to the back side end portion of the lens unit 15, includes a light transmission lens which transmits light to the solid state image pick-up device 31 on an optical axis of the solid state image pick-up device 31 and is held movably on a fixing frame 26. Additionally, this movable unit 25 is controlled to move in a vertical direction and a horizontal direction by a vertical direction drive motor and a horizontal direction drive motor which are disposed on the fixing frame 26. Further, the connecting plate 34 of the solid state image-pick-up device block 35 is secured to a back of the movable unit 25 with machine screws, and shaking is corrected by the solid state image pick-up device 31 being driven vertically and horizontally by the vertical direction drive motor and the horizontal direction drive motor together with the movable unit 25.

In addition, the inner housing 61 has the lens side housing 62 which is formed into a cylindrical shape which covers the circumferential edge of the lens unit 15 and which has openings at a front side end portion and a back side end portion and the main body side housing 63 which is formed into a hollow rectangular parallelepiped shape at the back side end portion of the lens side housing 62 and which has an opening at a back thereof. This inner housing 61 is formed of a metal material such as a magnesium alloy which has rigidity and a nigh thermal conductivity. In addition, as is shown in FIG. 4, the main body side housing 63 is formed smaller than a width of the main body portion 13 so that, when accommodated in the main body portion 13 of the outer housing 11, a wide space can be defined below a position which lies in the vicinity of a right-hand side wall and where the shutter button 16 and the like are disposed.

Further, as is shown in FIG. 5, the inner housing 61 is divided into an upper housing 65 and a lower housing 66 in a vertically central position. The upper housing 65 has connecting plates 65a which are formed in such a manner as to project outwards from lower edge portions of the lens side housing 62 so as to be connected to the fixing plates 15a of the lens unit 15 and the lower housing 66 and also has on an outer circumferential edge of the front side end portion of the lens side housing 62 a plurality of fixing projections 65b which are fixed to the outer housing 11. In addition, the lower housing 66 has connecting plates 66a which are formed in such a manner as to project outwards from upper edge portions of the lens side housing 62 so as to be connected to the fixing plates 15a of the lens unit 15 and the connecting plates 65a of the upper housing 65 and also has on the outer circumferential edge of the front side end portion of the lens side housing 62 a plurality of fixing projections 66b which are fixed to the outer housing 11.

Additionally, the upper housing 65 and the lower housing 66 are placed over the lens unit 15 in such a state that lower edge portions of the upper housing 65 and upper edge portions of the lower housing 66 are made to confront each other, and the connecting plates 65a, 66a of both the housings are placed close to the fixing plates 15a of the lens unit 15 so as to be fixed together with machine screws, whereby the upper housing 65 and the lower housing 66 are fixed to the lens unit 15. In addition, a small space is defined between the lens unit 15 and the inner housing 61, so that heat of the inner housing 61 is made difficult to be transmitted to the lens unit 15.

In addition, the inner housing 61 fixed to the lens unit 15 is, as is shown in FIG. 4, accommodated in the outer housing 11 and, although not shown, is fixed thereto by the fixing projections 65b, 66b on the upper housing 65 and the lower housing 66 being securely threaded into threads or grooves formed at a front side end portion of the front side projecting portion 12 of the outer housing 11. Additionally, as is shown in FIG. 3, the inner housing 61 is fixed in such a state that a predetermined space is defined between the outer housing 11 and itself, and the space so defined is made as a heat dissipating space.

As is shown in FIG. 4, the flash control circuit board 51 is disposed in the vicinity of a right-hand end of an interior of the main body side housing 63 of the inner housing 61 which is accommodated in an interior of the outer housing 11, and the battery accommodation box 52 is disposed in the space formed outside of the right-hand end of the inner housing 61 below the shutter button 16 and the like which configures a widest space among spaces formed with the outer casing 11.

Figure 7:
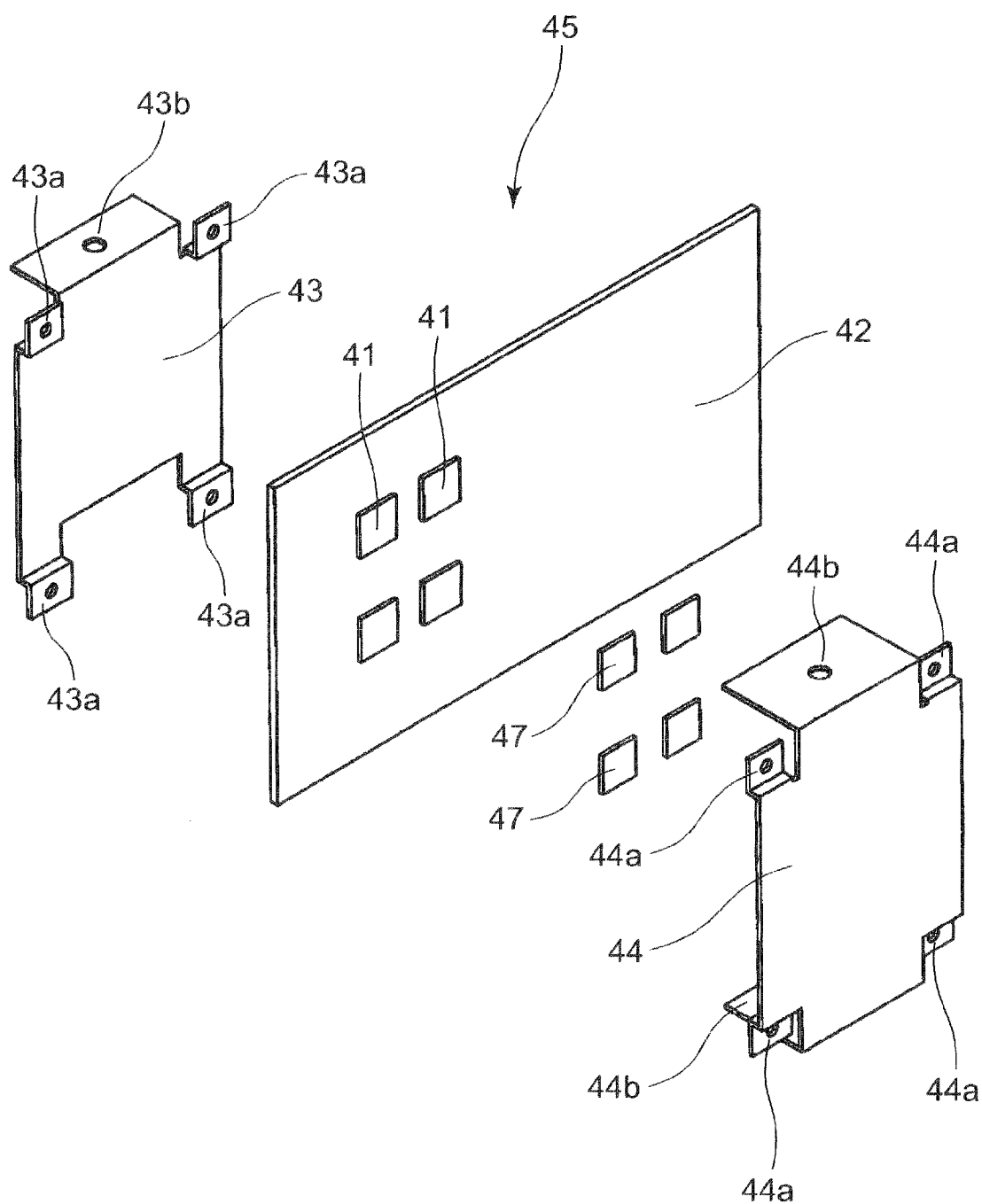
FIG. 7 is an exploded perspective view of an integrated circuit block according to the embodiment of the invention.

As is shown in FIG. 7, the integrated circuit block 45 includes a plurality of integrated circuits 41 which configure a second heat source, the main circuit board 42 to which the integrated circuits 41 are fixed, a front side circuit board holding member 43 and a back side circuit board holding member 44 which fix the integrated circuits 41 to the inner housing 61 and configure an integrated circuit heat conductive plate which releases heat of the integrated circuits 41 to the inner housing 61, and a plurality of heat conductive sheets 47 which are disposed between the integrated circuits 41 and the back side circuit board holding member 44 and are formed of a silicone rubber or the like.

The integrated circuits 41, which configure the second heat source, are fixed to the main circuit board 42, and the ASIC as the integrated circuits 41 includes a DSP (Digital Signal Processor) which processes digital signals of voice and image, a CODEC (coder/decoder) which has a function to convert analog data of voice and picture to digital codes and reconvert the digital codes back to the analog data, and a RAM (Random Access Memory) which temporarily stores image signals outputted from the solid state image pick-up device 31.

In addition, the main circuit board 42 is a rectangular plate in which its height is formed slightly smaller than the height of the main body side housing 63 of the inner housing 61 and its width is formed slightly smaller than the width of the main body portion 13 of the outer housing 11. The plurality of integrated circuits 41 are fixed to this main circuit board 42, and this main circuit board 42, the solid state image pick-up device 31 and the display device 21 are connected together via flexible sheets 38.

Additionally, the front side circuit board holding member 43 and the back side circuit board holding member 44 which are made as the integrated circuit heat conductive plate are formed of a metal material such as a copper plate having a high thermal conductivity and are attached to the main circuit board 42 with machine screws in such a state that a slight space is defined therebetween so as not to affect printed wirings on the main circuit, board 42 to which the integrated circuits 41 are fixed.

The front side circuit board holding member 43, which is made as the integrated circuit heat conductive plate, is a substantially square plate, and attaching legs 43a are formed in such a manner as to project to a back side thereof from positions lying in the vicinity of four corners so that the front side circuit board holding member 43 is attached to the main circuit board 42 with a predetermined space defined therebetween. In addition, on the front side circuit board holding member 43, a heat conductive plate 43b is formed at an upper end edge portion in such a manner as to project to a front-side thereof so as to be brought into surface contact with the inner housing 61, and its vertical height is formed slightly smaller than the height of the main circuit board 42. In addition, the front side circuit board holding member 43 is attached to the front side of the main circuit board 42 with the machine screws by the attaching legs 43a being placed close to positions on the main circuit board 42 where the legs 43a can be prevented from being brought into contact with the printed wirings. Further, the front side circuit board holding member 43 is disposed in a position where it resides close to the solid state image pick-up device heat dissipating plate 33 of the solid state image pick-up device block 35.

The back side circuit board holding member 44, which is made as the integrated circuit heat conductive plate, is a substantially square plate which is formed, as with the front side circuit board holding member 43 of a metal material such as a copper plate having a high thermal conductivity, and attaching legs 44a are formed in such a manner as to project to a front side thereof from positions lying in the vicinity of four corners so that the back side circuit board holding member 44 is attached to the main circuit board 42 with a predetermined space defined therebetween. In addition, on the back side circuit board holding member 44, heat conductive plates 44b are formed at upper and lower end edge portions in such a manner as to project to the front side thereof so as to be brought into surface contact with the inner housing 61, and its vertical height is formed slightly higher than the height of the main circuit board 42. In addition, the back side circuit board holding member 44 is attached to the back side of the main circuit board 42 with the machine screws by the attaching legs 44a being placed close to positions on the main circuit board 42 where the legs 44a can be prevented from being brought into contact with the printed wirings and is in surface contact with the integrated circuits 41 via heat conductive sheets 47. Further, the heat conductive plate 44b formed at the upper end of the back side circuit board holding member 44 is positioned above the heat conductive plate 43b of the front side circuit board holding member 43 so as to define a predetermined space between the heat conductive plate 43b of the front side circuit board holding member 43.

In addition, as is shown in FIGS. 3 and 4, the integrated circuit block 45 is disposed in the vicinity of the rear of the lens barrel which lies close to the back side end portion of the inner housing 61, and an upper side of one main body side housing 63 of the inner housing 61 is fittingly inserted into the space defined between the heat conductive plate 43b of the front side circuit board holding member 43 and the upper heat conductive plate 44b of the back side circuit board holding member 44. Thus, the integrated circuit clock 45 is attached to the inner housing 61 with machine screws in such a manner that the main body side housing 63 of the inner housing 61 is held between the upper and lower heat conductive plates 44b of the back side circuit board holding member. 44.

In addition, as is shown in FIGS. 3 and 4, the display device 21 is disposed on a back side of the integrated circuit block 45 in such a manner as to lie close thereto, and the back side housing 20 is fixed to the outer housing 11 from a back side of the display device 21.

Next, a heat dissipating system according to the embodiment will be described. As has been described heretofore, in the digital camera 1 of this embodiment, the inner housing 61 is made as the heat dissipating device, and heat of the heat sources is released to the inner housing 61 by the members such as the copper plates having the high thermal conductivity, thereby making it possible to prevent the heat sources from being heated to high temperatures.

Namely, in this embodiment, the solid state image pick-up device 31 which configures the first heat source and the integrated circuits 41 which configure the second heat source are the components which configure the heat sources. These solid state image pick-up device 31 and integrated circuits 41 have their own so-called operation ensuring temperatures, and in the event that the temperatures so called are surpassed, image data has to include much noise and there may sometimes emerge a situation where those components do not operate properly. Therefore, the temperatures of the solid state image pick-up device 31 and the integrated circuits 41 need to be maintained lower than the operation ensuring temperatures at all times.

Figure 8:
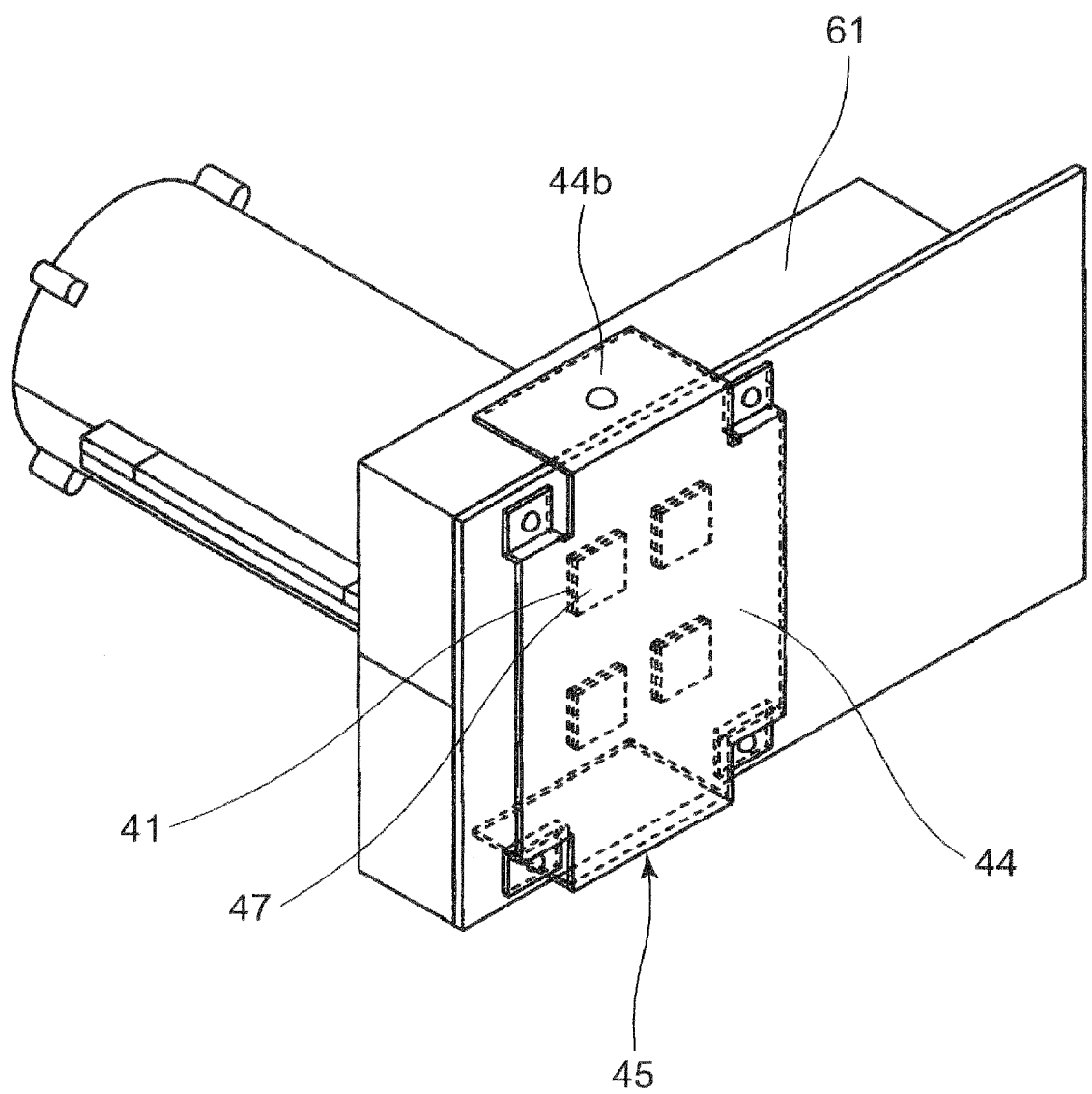
FIG. 8 is a perspective view illustrating a heat dissipating device for an inner lens barrel and the integrated circuit block according to the embodiment of the invention.
Figure 9:
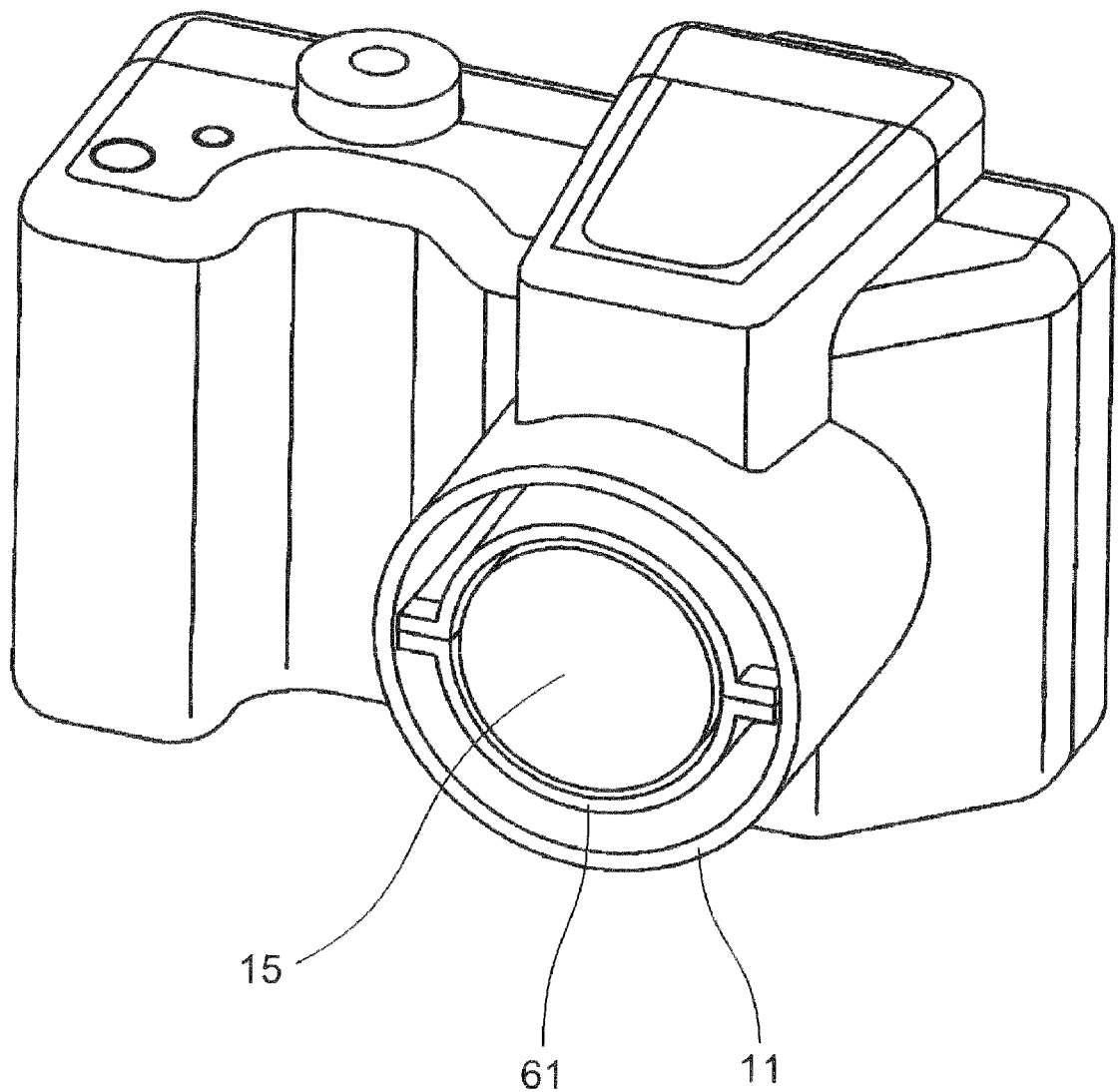
FIG. 9 is a perspective view showing a space defined between the inner lens barrel and an outer lens barrel according to the embodiment of the invention.

In this embodiment, the integrated circuits 41, which configure the second heat source, are, as is shown in FIG. 8, in contact with the back side circuit board holding member 44 via the heat conductive sheets 47, heat of the integrated circuits 41 can be released to the back side circuit board holding member 44. In addition, since the back side circuit board holding member 44 is in contact with the inner housing 61 at the heat conductive plates 44b, the heat transmitted to the back side circuit board holding member 44 from the integrated circuits 41 can be released to the inner housing 61. Additionally, since the inner housing 61 is formed of the member made of a magnesium alloy having the high thermal conductivity and is sized to cover the circumferential edge of the lens unit 15, not only an extremely large heat storage volume but also a wide heat dissipating area can be ensured. Consequently, the heat transmitted from the back side circuit board holing member 44 to the inner housing 61 is stored in the whole of the inner-housing 61 while being dispersed thereover and is then dissipated from the wide area, and therefore, not only the main body portion 13 but also the front side projecting portion 12 side of the outer housing 11 which is the outer casing are not heated to such a high temperature as to be felt hot. In addition, as is shown in FIG. 9, since the space is defined between the inner housing 61 and the outer housing 11, by making use of the space so defined as the heat dissipating space, the heat dissipating effect can be enhanced further.

In addition, in this embodiment, as is shown in FIGS. 3 and 7, since the front side circuit board holding member 43 is attached to the front side of the main circuit board 42 in such a manner as to cover the front side of the main circuit board 42 and the front side circuit board holding member 43 is in contact with the inner housing 61 at the heat conductive plate 43b thereof, heat of the integrated circuits 41 which leaks from the front side of the main circuit board 42 can be released to the inner housing 61 via the front side circuit board holding member 43, thereby making it possible to prevent the heat of the integrated circuits 41 being transmitted to the solid state image pick-up device 31.

Additionally, as is shown in FIG. 3, since the front side circuit board holding member 43 is placed extremely close to the solid state image pick-up device heat dissipating plate 33, in the event that the temperature of the front side circuit board holding member 43 has the temperature of the solid state image pick-up device heat dissipating plate 33, heat of the solid state image pick-up device 31 can be released to the inner housing 61 via the front side circuit board holding member 43. Because of this, the solid state image pick-up device 31 can be prevented from being heated to high temperatures, and as the front side circuit board holding member 43 lies closer to the solid state image pick-up device heat dissipating plate 33, this heat dissipating effect becomes larger.

In addition, there may be a situation in which a fluid such as an oil is injected to be held in the space between the solid state image pick-up device heat dissipating plate 33 and the front side circuit board holding member 43 or a bearing or the like is interposed therebetween with a view to increasing the thermal conductivity from the solid state image pick-up device heat dissipating plate 33 to the front side circuit, board holding member 43, while the solid state image pick-up device 31 and the solid state image pick-up device heat dissipating plate 33 are made to move together with the movable unit 25 so as to prevent shaking.

According to the digital camera 1 of the embodiment, the camera housing is formed into the double housing construction by the outer housing 11 which is formed of the member having the low thermal conductivity and the inner housing 61 which is formed of the member having the high rigidity and high thermal conductivity and is made into the heat dissipating device, and the heat dissipating space is defined between the outer housing 11 and the inner housing 61, thereby making it possible to prevent the transmission of heat in the interior of the camera to the photographing person via the outer housing 11. In addition, since heat can be stored and dissipated by the inner-housing 61 which has the extremely large heat storage volume and wide heat dissipating area, the heat dissipating effect of dissipating heat of the devices configuring the heat sources can be enhanced further. Furthermore, since the double housing construction is adopted, the outer housing 11 lying on the outer side of the camera housing has a certain degree of freedom in design, and since the rigidity of the inner housing 61 is high, the rigidity of the digital camera 1 can be increased.

In addition, since the integrated circuits 41, which configure the second heat source, and the inner housing 61 are connected together by the back side circuit board holding member 44 which is the component made of the member having the high thermal conductivity, heat of the integrated circuits 41 can be released to the inner housing 61 via the back side circuit board holding member 44. Therefore, the temperature of the integrated circuits 41 can be prevented from surpassing their own operation ensuring temperature. Further, since the heat of the integrated circuits 41 can be released to the inner housing 61, there is no case where the integrated circuit block 45 is heated to high temperatures, and therefore, the display device 21 can be disposed close to the integrated circuit block 45. Consequently, since a space saving design becomes possible, the camera main body can be made smaller in size and thinner in thickness.

Furthermore, since, by the inner housing 61 being made up of the main body side housing 63 which lies in the vicinity of the solid state image pick-up device 31 and the integrated circuits 41 and the lens side housing 62 which covers the circumferential edge of the lens unit 15, the circumferential edge of the lens unit 15 which has a largest area can be made use of for heat storage and dissipation, the heat dissipating effect can be enhanced.

In addition, since the front side circuit board holding member 43 and the back side circuit board holding member 44 are made of the metal having the high thermal conductivity and are made to cover the control circuits such as the integrated circuits 41 and the inner housing 61 is made of the metal having the high thermal conductivity and is made to surround to cover the control circuits such as the integrated circuits 41, electromagnetic noise can be cut off and electrostatic current can be prevented, thereby making it possible to realize a stable control operation.

Additionally, since the integrated circuit heat conductive plate which releases the heat of the integrated circuits 41 to the inner housing 61 is in contact with the integrated circuits 41 via the heat conductive sheets 47 which configure insulation materials, the heat of the integrated circuits 41 can be released and a current flowing through the circuits can be prevented from being affected by the heat.

Note that while in the embodiment described heretofore, the digital camera 1 has been described in which the inner zooming lens unit 15 and the camera main body is formed into the integral unit, the same heat dissipating effect can be used also in a digital camera on which lens units are interchangeable by forming each of an interchangeable lens and a camera main body into a double housing construction by an outer housing and an inner housing and forming so that the inner housing of the camera main body and the inner housing of the interchangeable lens are brought into contact with each other when the interchangeable lens is attached to the camera main body.

Additionally, in a collapsible type digital camera in which the length of a lens barrel changes as in a zoom lens in which a fore-element of the lens is moved back and forth, the same heat dissipating effect can be obtained by forming an inner housing by a main body side housing and a lens side housing which is longer than the main body side housing by an amount which is slightly longer than the barrel length of a fixed lens group.

Further, the invention is not limited to the embodiment that has been described heretofore but can be modified or improved variously without departing from the spirit and scope of the invention. For example, while the heat conductive plate (the front side circuit board holding member 43) which is situated between the main circuit board 42 and the solid state image pick-up device heat dissipating plate 33 is configured so as to be connected to the main circuit board 42 and the inner housing 61 as the integrated circuit heat dissipating plate which releases the heat of the integrated circuits 41 to the inner housing 61, the heat conductive plate may be configured as a heat conductive plate which is intended mainly to release the heat of the solid state image pick-up device 31 to the inner housing 61 while being disposed close to the solid state image pick-up device heat dissipating plate 33 with its end portion connected to the inner housing 61.

DESCRIPTION OF REFERENCE NUMERALS

1 digital camera; 11 outer housing; 12 front side projecting portion; 13 main body portion; 15 lens unit; 15a fixing plate; 16 shutter button; 17 image pick-up mode switching control dial; 18 flash; 20 back side housing; 21 display device; 22 direction key; 23 menu choice button; 25 movable unit; 26 fixing frame; 31 solid state image pick-up device; 32 solid state image pick-up device fixing substrate; 32a opening; 33 solid state image pick-up device heat dissipating plate; 33a projecting portion; 33b leg portion; 34 connecting plate; 34a opening; 34b leg portion; 35 solid state image pick-up device block; 37 heat conductive sheet; 38 flexible sheet; 41 integrated circuit; 42 main circuit board; 43 front side circuit board holding member; 43a attaching leg; 43b heat conductive plate; 44 back side circuit board holding member; 44a attaching leg; 44b heat conductive plate; 45 integrated circuit block; 47 heat conductive sheet; 51 flash control circuit board; 52 battery accommodation box; 61 inner housing; 62 lens side housing; 63 main body side housing; 65 upper housing; 65b fixing projection; 65a connecting plate; 66 lower housing; 66a connecting plate; 66b fixing projection.

What is claimed is:
1. A digital camera comprising:
a lens unit,
a solid state image pick-up device,
an integrated circuit, and
a camera housing,
wherein the camera housing is made to have a double housing construction by an outer housing which is formed of a member having a low thermal conductivity, and an inner housing which has an opening at a back side end, which is formed of a member having a high rigidity and a high thermal conductivity, and which is made into a heat dissipating device,
wherein a heat dissipating space is defined between the outer housing and the inner housing, wherein the inner housing has a shape in which at least a part of a component which configures a heat source is accommodated, wherein a whole of the inner housing is formed by a same material, the inner housing being made up of a main body side housing which is situated in a vicinity of the solid state image pick-up device and the integrated circuit, and a lens side housing which covers a circumferential edge of the lens unit, wherein heat is dissipated from the whole surfaces of the main body side housing and the lens side housing, and wherein the lens side housing of the inner housing is formed into a cylindrical shape and has openings at a front end side portion and a back end side portion thereof, and the main body side housing of the inner housing is formed into a hollow rectangular parallelepiped shape at the back end side portion of the lens side housing and has the opening at the back side end thereof.

2. The digital camera as set forth in claim 1, further comprising a member having a high thermal conductivity provided in an interior of the camera housing, wherein the component which configures the heat source and the inner housing are connected together by said member.

3. The digital camera as set forth in claim 2, wherein said member is connected to the main body side housing of the inner housing at the back side end of the inner housing.

4. The digital camera as set forth in claim 2, further comprising a plurality of heat conductive sheets which are disposed between the component which configures the heat source and said member, wherein heat generated by the heat source is released to the inner housing via the plurality of heat conductive sheets and said member.

* * * * *